(12) United States Patent
Wie et al.

(10) Patent No.: US 10,365,039 B2
(45) Date of Patent: Jul. 30, 2019

(54) MULTI-STAGE SEPARATION HEAT-EXCHANGE TYPE DRYING SYSTEM

(71) Applicant: A1ENGINEERING, Suncheon-si (KR)

(72) Inventors: Hyung Chul Wie, Suncheon-si (KR); Se Gyeong Jang, Suncheon-si (KR); Sang Ro Lee, Suncheon-si (KR)

(73) Assignee: A1ENGINEERING, Suncheon-si (KR)

( * ) Notice: Subject to any disclaimer, the term of this patent is extended or adjusted under 35 U.S.C. 154(b) by 98 days.

(21) Appl. No.: 15/555,967

(22) PCT Filed: Mar. 9, 2016

(86) PCT No.: PCT/KR2016/002321
§ 371 (c)(1),
(2) Date: Sep. 5, 2017

(87) PCT Pub. No.: WO2017/090834
PCT Pub. Date: Jun. 1, 2017

(65) Prior Publication Data
US 2018/0058759 A1 Mar. 1, 2018

(30) Foreign Application Priority Data
Nov. 24, 2015 (KR) .......................... 10-2015-0164976

(51) Int. Cl.
*F26B 21/00* (2006.01)
*F26B 3/02* (2006.01)
(Continued)

(52) U.S. Cl.
CPC .............. *F26B 21/002* (2013.01); *A23B 4/03* (2013.01); *A23B 4/031* (2013.01); *A23B 7/02* (2013.01);
(Continued)

(58) Field of Classification Search
CPC ........ F26B 21/002; F26B 23/002; F26B 3/02; F26B 9/066; F26B 21/06; A23B 4/03;
(Continued)

(56) References Cited

U.S. PATENT DOCUMENTS 4,666,531 A * 5/1987 Minard .................... F28G 9/00
134/26

FOREIGN PATENT DOCUMENTS

JP       2004-242701 A    9/2004
KR    20-1997-0050089 U    8/1997
(Continued)

*Primary Examiner* — Jessica Yuen
(74) *Attorney, Agent, or Firm* — Patent Office of Dr. Chung Park

(57) ABSTRACT

A multi-stage separation heat-exchange type drying system is provided. A plurality of first heat exchange blocks of the first main body are installed to be spaced from each other at a predetermined interval, and first vortex generating blocks are installed between the first heat exchange blocks. Also, a plurality of second heat exchange blocks of the second main body are installed to be spaced apart from each other at a predetermined interval, and second vortex generating blocks are installed between the second heat exchange blocks. The heat exchange occurs in a manner that the first heat exchange blocks and the second heat exchange blocks corresponding to each other, positioned up and down, exchange a heat medium therebetween.

4 Claims, 7 Drawing Sheets

(51) Int. Cl.
F26B 9/06 (2006.01)
F26B 21/06 (2006.01)
A23B 4/03 (2006.01)
A23B 7/02 (2006.01)
A23N 12/08 (2006.01)
F28G 9/00 (2006.01)
F28G 15/00 (2006.01)
F28D 1/04 (2006.01)
F28D 21/00 (2006.01)
F26B 23/00 (2006.01)
F28D 1/047 (2006.01)

(52) U.S. Cl.
CPC ............ *A23B 7/0205* (2013.01); *A23N 12/08* (2013.01); *F26B 3/02* (2013.01); *F26B 9/066* (2013.01); *F26B 21/06* (2013.01); *F26B 23/002* (2013.01); *F28D 1/0426* (2013.01); *F28D 21/0014* (2013.01); *F28G 9/00* (2013.01); *F28G 15/003* (2013.01); *F28D 1/0477* (2013.01); *Y02P 60/853* (2015.11); *Y02P 70/40* (2015.11); *Y02P 70/405* (2015.11)

(58) Field of Classification Search
CPC ......... A23B 7/02; A23B 4/031; A23B 7/0205; Y02P 60/853; Y02P 70/40; Y02P 70/405; A23N 12/08; F28G 9/00; F28G 15/003; F28D 21/0014; F28D 1/0477
See application file for complete search history.

(56) References Cited

FOREIGN PATENT DOCUMENTS

| | | |
|---|---|---|
| KR | 10-2007-0034446 A | 3/2007 |
| KR | 20-2010-0002586 U | 3/2010 |
| KR | 10-2012-0070958 A | 7/2012 |
| KR | 10-2014-0078844 A | 6/2014 |
| WO | 2005-084450 A2 | 9/2005 |

* cited by examiner

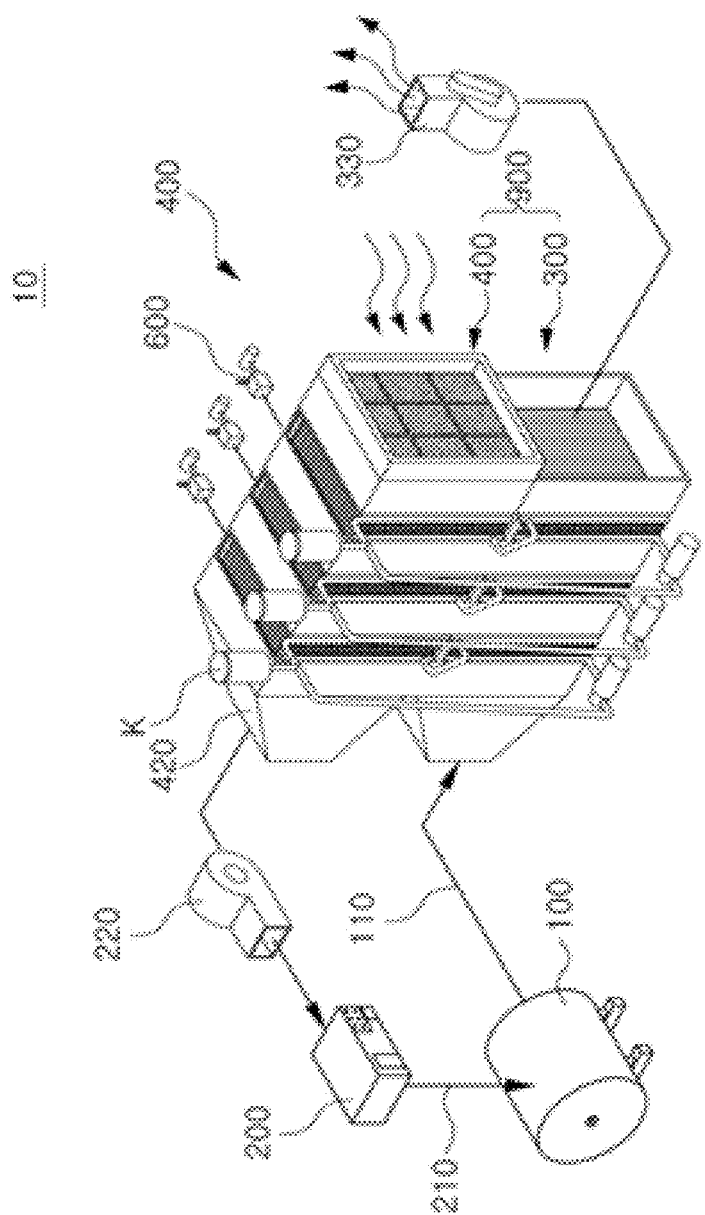
[FIG. 1]

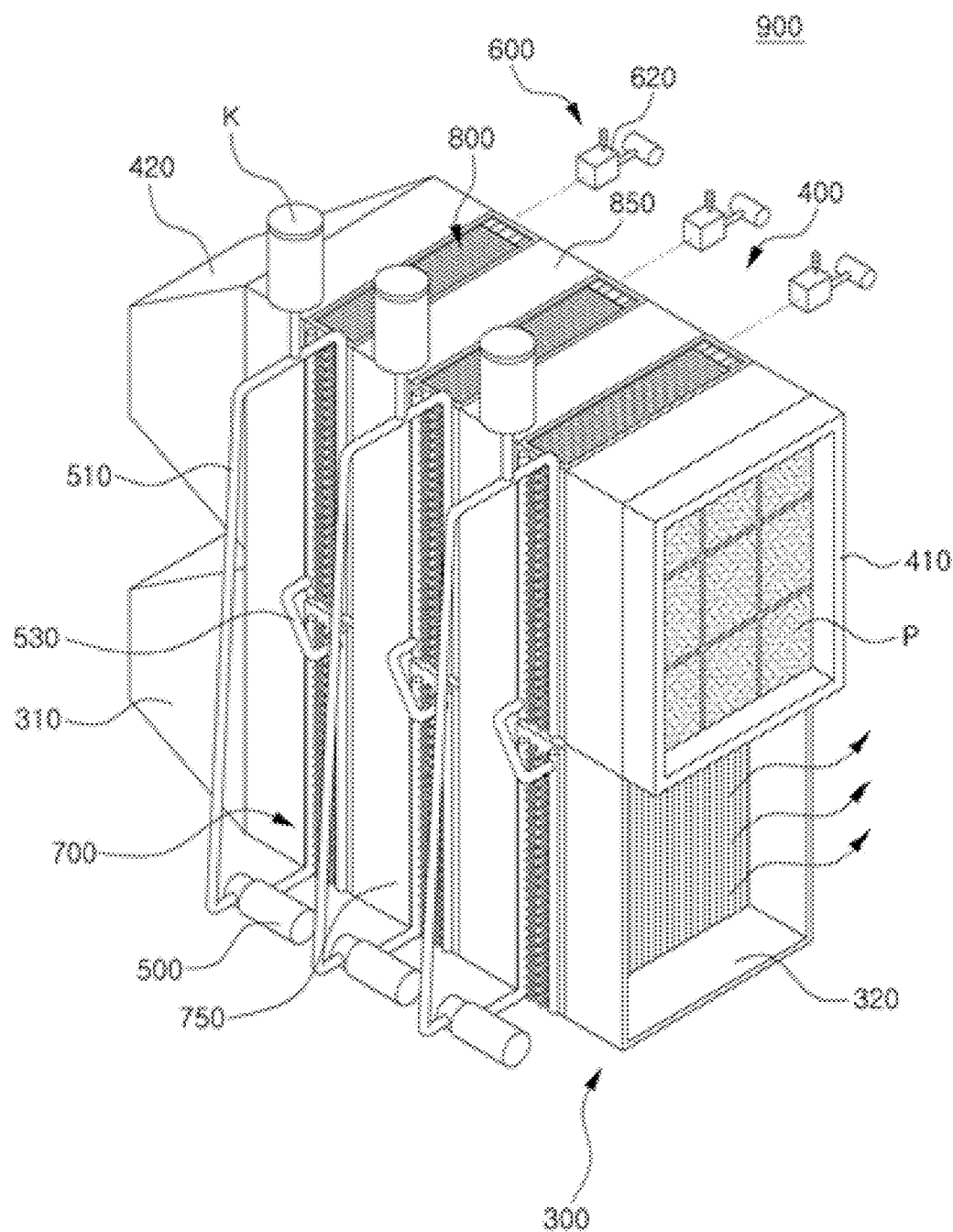
[FIG. 2]

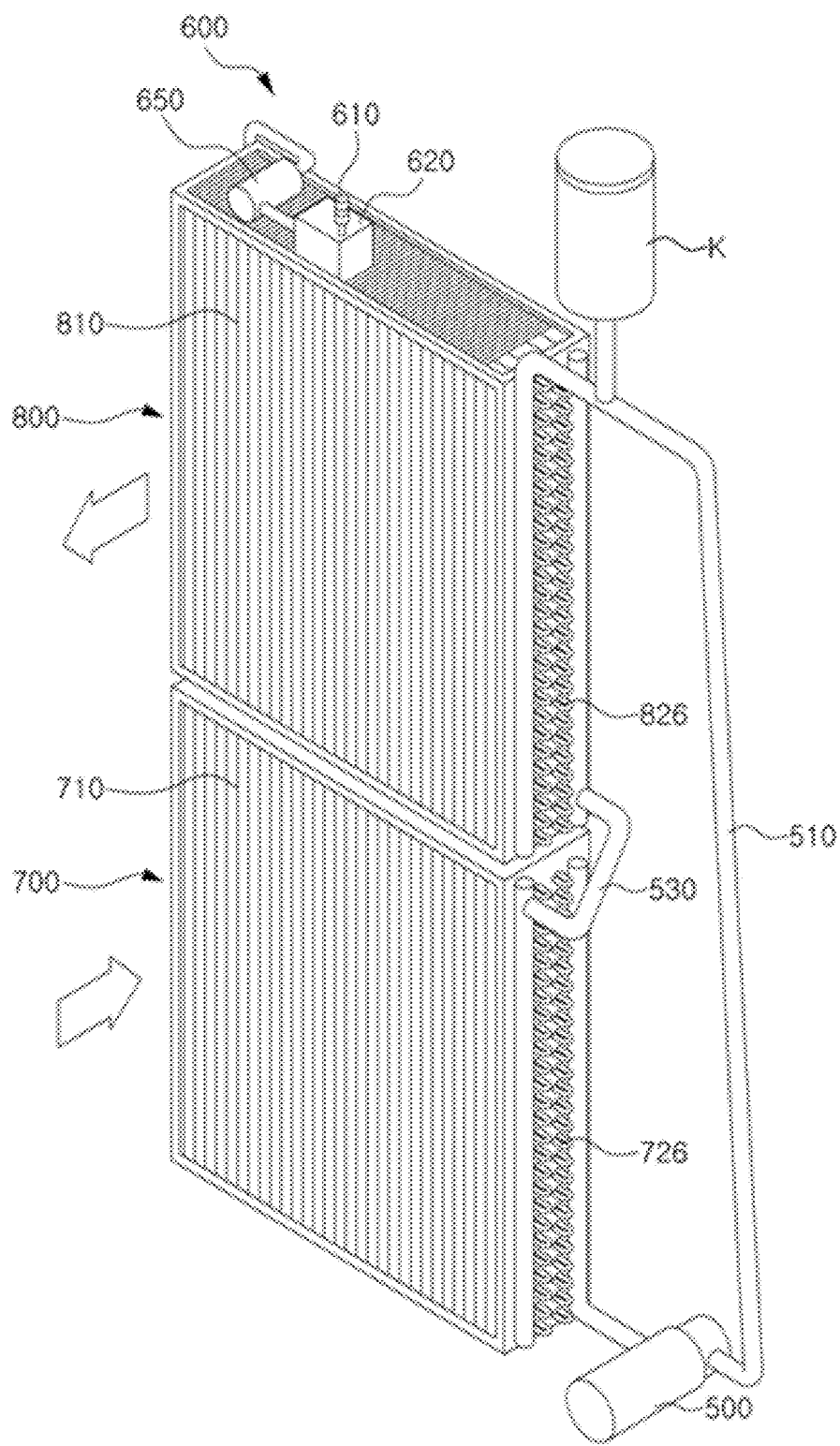
[FIG. 3]

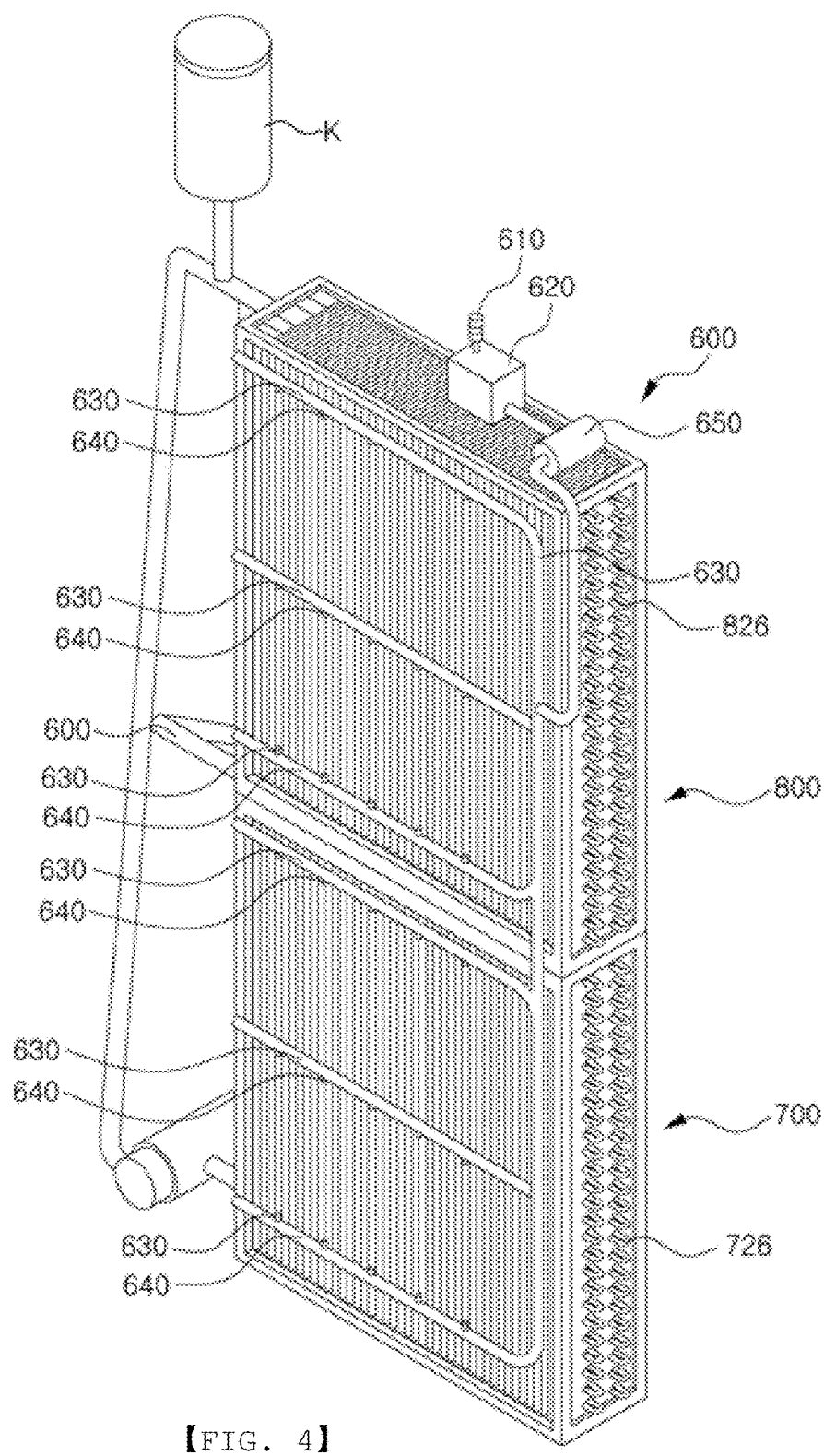
[FIG. 4]

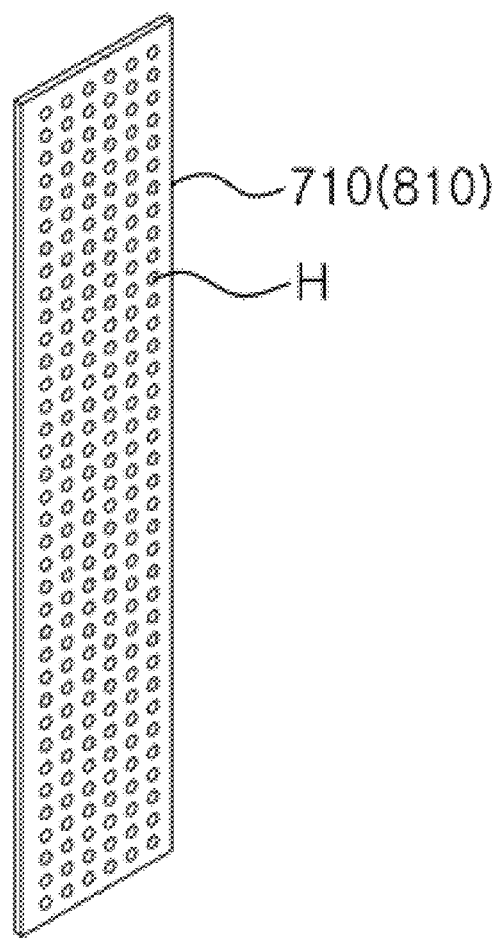
[FIG. 5]

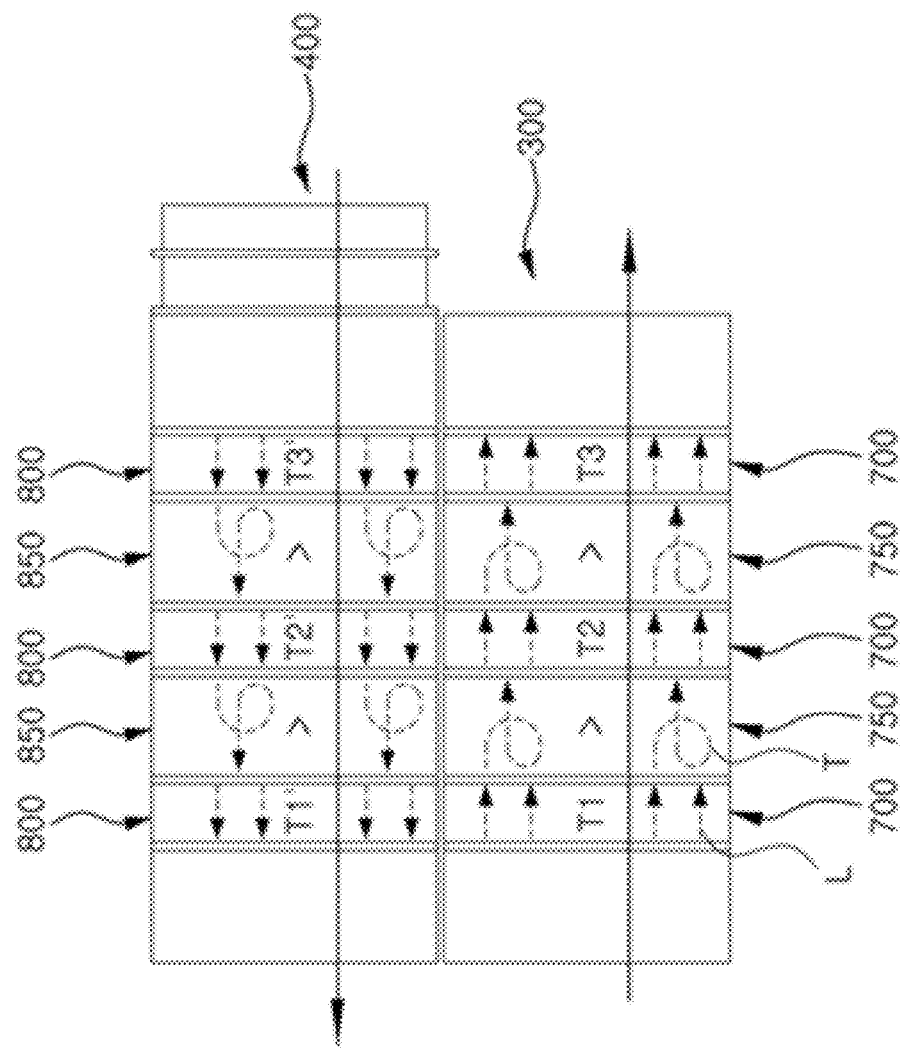
[FIG. 6]

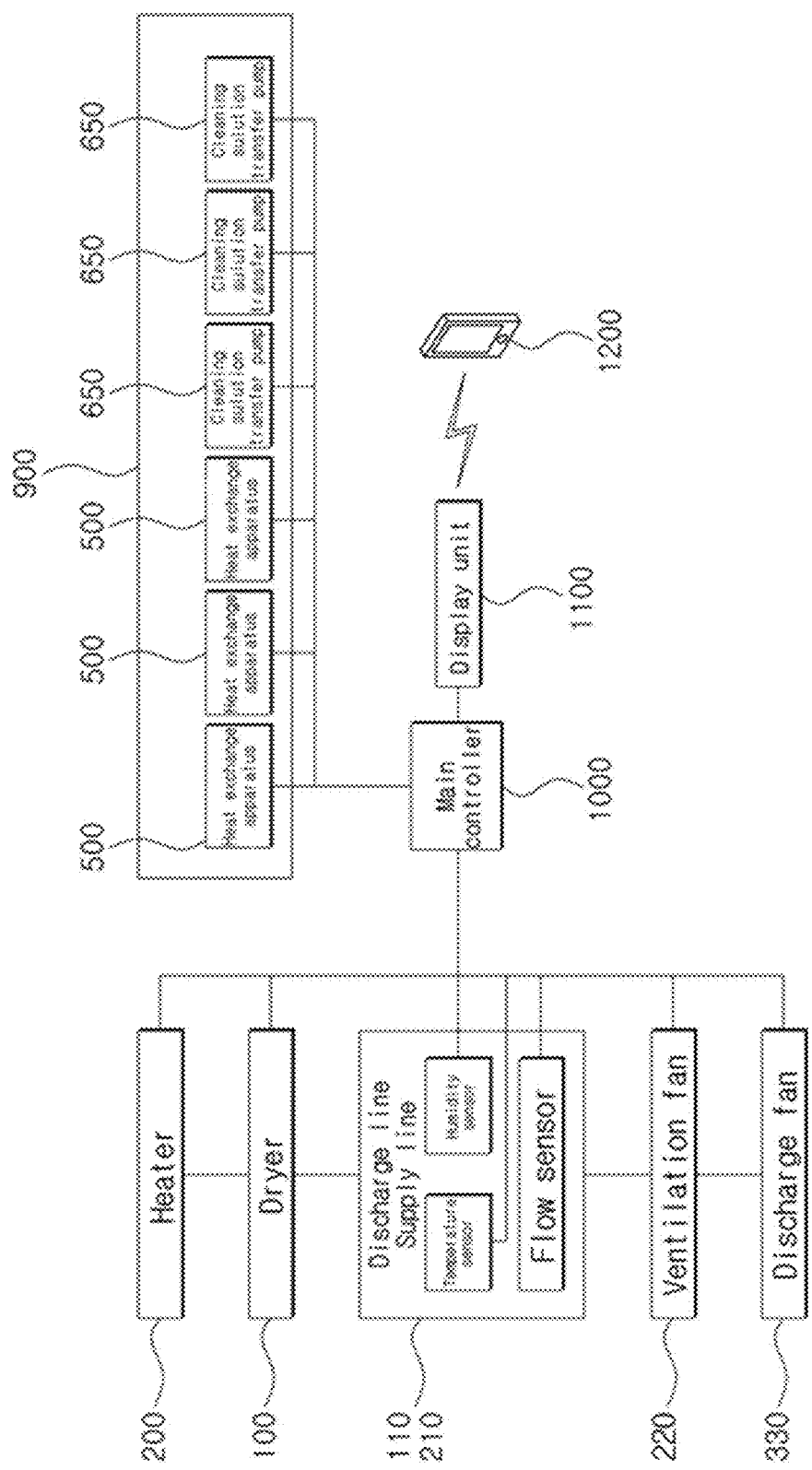
[FIG. 7]

MULTI-STAGE SEPARATION HEAT-EXCHANGE TYPE DRYING SYSTEM

CROSS-REFERENCE TO PRIOR APPLICATIONS

This application is a national Stage Patent Application of PCT International Patent Application No. PCT/KR2016/002321, filed on Mar. 9, 2016 under 35 U.S.C. § 371, which claims priority of Korean Patent Application No. 10-2015-0164976, filed on Nov. 24, 2015, which are all hereby incorporated by reference in their entirety.

TECHNICAL FIELD

The present invention relates to a dry system of a multi-staged separation heat exchange type and more particularly, to a dry system of a multi-staged separation heat exchange type, which stepwise performs a heat exchange on outside air using a heat exchange medium when the outside air is preheated by recovering waste heat discharged after a raw material is dried in a dryer.

BACKGROUND ART

An industrial dry apparatus, in particular, an agricultural and marine product dry apparatus has a structure in which a dry room in which wicker trays containing a dry matter are stacked and accommodated is included, a burner having a heat exchanger and a ventilator are disposed in a heating room connected to the dry room, the outside cold air introduced through an air inlet port is heated to dry the dry matters while passing through the dry room, and waste heat passing through the dry room is externally discharged through a vent pipe.

However, heat efficiency is low because much time and excessive consumption of fuel are required in order for the outside cold air to heat the dry room to a required temperature through the heat exchanger.

Accordingly, there is a growing interest in a dry apparatus which reuses the waste heat discharged by the dry room.

However, waste heat air discharged by the dry room cannot be directly used because it has high humidity. For example, there has been known a dry apparatus in which a radiator or heating pipe using the waste heat discharged through the vent pipe of the dry room is disposed in the air inlet port of the dry apparatus so that the outside cold air is primarily heated, introduced into the heating room of the dry apparatus, and secondarily heated by the heat exchanger.

In the case of the dry apparatus using the waste heat of the dray room as described above, however, there are problems in that the design and fabrication are difficult and the size of the apparatus is increased because the heat exchanger must be integrally formed within the dry apparatus. Accordingly, in order to solve the problems, Korean Patent Application Publication No. 2012-0070958 (laid open on Jul. 2, 2012) has disclosed contents in which a waste heat reclaimer is installed on the inlet side of a dry apparatus in order to improve dry efficiency and to be easily applied to an existing dry apparatus. Furthermore, Korean Patent Application Publication No. 2007-0034446 (laid open on Mar. 28, 2007) has disclosed contents in which a heat exchanger including a boiler is disposed separately from a dryer.

However, a conventional heat exchange method using waste heat including the patent documents has a disadvantage in that heat exchange efficiency is poor because the method is a method of disposing a pipe along which waste heat air flows in one space having a heat exchange performed therein and absorbing the heat of the waste heat air by allowing outside air to pass through the space.

Meanwhile, Japan Patent Application Publication No. 2004-242701 (laid open Sep. 2, 2004) discloses that waste heat discharged by a boiler is recovered by a heat exchanger separated from the boiler, outside air for dry is simultaneously introduced into the air inlet port of the heat exchanger, and hot air for dry is generated by the heat exchange of the outside air and the waste heat. In this case, a heat exchange medium is used to recover the waste heat.

In the heat exchanger disclosed in the prior art, an upper block through which the waste heat passes and a lower block through which the outside air for dry passes are disposed side by side up and down. The heat exchange medium passes between the upper block and the lower block, thereby performing a heat exchange. There is a problem in that heat exchange efficiency is not good because the upper block and the lower block are formed of one block.

Meanwhile, the waste heat air discharged by the dry room is corrosive and contains a large amount of dust containing a contaminant component. If the waste heat air passes through the heat exchanger, heat efficiency of the heat exchanger is suddenly lowered and a fouling phenomenon in which a pipe heating surface is corroded is generated because a large amount of dust is attached to the pipe heating surface. Accordingly, there are problems in that heat efficiency of the heat exchanger is significantly deteriorated and the lifespan of the heat exchanger is greatly reduced.

DISCLOSURE

Technical Problem

The present invention has been made keeping in mind the above problems occurring in the prior art, and an object of the present invention is to provide a dry system of a multi-staged separation heat exchange type, which can easily recover waste heat discharged from a dryer after a raw material is dried through the heat medium of the plurality of first heat exchange blocks of the heat exchange apparatus separated in multiple stages and can further improve heat efficiency of the heat exchanger apparatus because the heat medium that has recovered the waste heat is introduced into the plurality of second heat exchange blocks of the heat exchange apparatus disposed in accordance with the first heat exchange blocks and is circulated while preheating outside air introduced into the second heat exchange blocks.

Furthermore, another object of the present invention is to provide a dry system of a multi-staged separation heat exchange type, which can greatly extend heat exchange efficiency and lifespan of a heat exchange apparatus by preventing the deterioration of heat efficiency of the heat exchange apparatus and a fouling phenomenon in which a heating surface is corroded due to dust attached to the heating surface in such a way as to easily clean a large amount of dust attached to the heating surface of the heat exchange apparatus due to waste heat through a cleaning solution spray unit.

Technical Solution

A dry system of a multi-staged separation heat exchange type according to the present invention for solving the above objects includes a dryer 100, a heat exchange apparatus 900 recovering heat from first air of a high temperature and high humidity discharged by the dryer 100, heating-exchanging the first air with outside dry second air of a low temperature and discharging the heat-exchanged air, a heater 200 heating the second air discharged by the heat exchange apparatus 900, a discharge fan 330 supplying the first air discharged by the dryer 100 to the heat exchange apparatus 900 and externally discharging the first air, and a ventilation fan 220 supplying the second air discharged by the heat exchange apparatus 900 to the dryer 100 through the heater 200. In this case, the heat exchange apparatus 900 includes a first main body 300 in which the first air discharged by the dryer 100 flows therein on one side and exits therefrom on the other side, a plurality of first heat exchange blocks 700 having first heat medium circulation tubes 726 disposed therein is disposed at specific intervals so that a heat medium heat-exchanged with the first air circulates within the first heat exchange blocks 700 in a width direction from front to back, and a first whirl generation block 750 changing a flow of the first air passing through the first heat exchange block 700 into a whirl is disposed between the first heat exchange blocks 700; a second main body 400 which is disposed over or under the first main body 300 adjacent to the first main body 300 and in which the second air flows therein on the other side and exits therefrom on one side, and a plurality of second heat exchange blocks 800 having second heat medium circulation tubes 826 disposed therein is disposed at specific intervals within the second main body 400 so that a heat medium heat-exchanged with the second air circulates within the second heat exchange blocks 800 in the width direction from front to back, wherein the second heat exchange block 800 is disposed over or under a corresponding first heat exchange block 700, the heat exchange blocks 700 and 800 corresponding to each other up and down exchange heat media, and a second whirl generation block 850 changing a flow of the second air passing through the second heat exchange block 800 to a whirl is disposed between the second heat exchange blocks 800; a plurality of heat medium connection pipes 530 which are paths each of which is connected to the first heat medium circulation tube 726 and the second heat medium circulation tube 826 and along each of which the heat medium heat-exchanged with the first air passing through the first heat exchange block 700 is introduced into a corresponding second heat exchange block 800 and a plurality of heat medium circulation pipes 510 which are paths along each of which the heat medium introduced from the first heat exchange block 700 to the second heat exchange block 800 and heat-exchanged with the second air passing through the second heat exchange block 800 is introduced into a corresponding first heat exchange block 700 again; a plurality of heat medium circulation pumps 500 each disposed along the path of the heat medium circulation pipe 510 and circulating the heat media of the first and the second heat exchange blocks 700 and 800 corresponding to each other; a plurality of cleaning solution spray units 600 each disposed in the first and the second heat exchange blocks 700 and 800 and removing dust attached to the first and the second heat medium circulation tubes 726 and 826 within the first and the second heat exchange blocks, respectively; and a main controller 1000 controlling the ventilation fan 220 and the discharge fan 330 so that flow rates of the first air and the second air flowing into a discharge line 110 and a supply line 210 are adjusted, controlling the heat medium circulation pumps 500 so that a circulation flow rate and velocity of the heat media flowing into the first and the second heat exchange blocks 700 and 800 are adjusted, and controlling the cleaning solution spray units 600 so that a cleaning solution is adjusted and sprayed based on a set time and amount.

Furthermore, the cleaning solution spray unit 600 includes a cleaning solution tank 620 in which a cleaning solution inlet 610 to which a cleaning solution is injected from the outside is formed; cleaning solution transfer lines 630 connected to the cleaning solution tank 620 to form a path along which the cleaning solution is transferred and disposed in multiple columns in a height direction of the heat exchange blocks 700 and 800; a plurality of cleaning solution spray nozzles 640 disposed in the width direction of the heat exchange blocks 700 and 800 on the cleaning solution transfer lines 630 from front to back and removing dust attached to the heat medium circulation tubes 726 and 826 within the heat exchange blocks 700 and 800; and a cleaning solution transfer pump 650 disposed over the cleaning solution transfer lines 630 on the side of the cleaning solution tank 620 and transferring and spraying the cleaning solution.

Furthermore, the main controller 1000 receives information from a temperature sensor, a humidity sensor and a flow sensor disposed in each of the discharge line 110 and the supply line 210 and controls each of the heat medium circulation pumps 500 so that the flow rate and transfer velocity of a heat medium circulating the first and the second heat exchange blocks 700 and 800 corresponding to each other are adjusted.

In addition, a plurality of first and second heat exchange plates 710 and 810 in each of which a plurality of circulation tube through holes H having each of the plurality of first and the second heat medium circulation tubes 726 and 826 penetrating therethrough has been formed is disposed within the first and the second heat exchange blocks 700 and 800, respectively, at specific intervals in the width direction of the first and the second heat exchange blocks 700 and 800 from front to back. The inside of each of the first and the second whirl generation blocks 750 and 850 includes an empty space. The flows of the first air and the second air passing through the first and the second heat exchange blocks 700 and 800 are introduced into the first and the second whirl generation blocks 750 and 850 and changed to whirls.

Advantageous Effects

In accordance with the dry system of a multi-staged separation heat exchange type of the present invention, there are effects in that waste heat discharged from the dryer after a raw material is dried can be easily recovered through the heat medium of first heat exchange blocks of the heat exchange apparatus separated in multiple stages and heat efficiency of the heat exchanger apparatus can be further improved because the heat medium that has recovered the waste heat is circulated while preheating outside air introduced into the second heat exchange blocks. Furthermore, there are excellent effects in that the deterioration of heat efficiency of the heat exchange apparatus and a fouling phenomenon in which the heating surface is corroded due to dust attached to the heating surface can be prevented by easily cleaning a large amount of dust attached to the heating surface of the heat exchange apparatus due to waste heat through the cleaning solution spray unit, and thus the lifespan of the heat exchange apparatus can be greatly extended.

DESCRIPTION OF DRAWINGS

FIG. 1 shows the configuration of a dry system of a multi-staged separation heat exchange type according to an embodiment of the present invention, FIG. 2 is a perspective view of a heat exchange apparatus of FIG. 1, FIGS. 3 and 4 show the configuration of major elements of the heat exchange apparatus of FIG. 2, FIG. 5 is a perspective view of first and the second heat exchange plates disposed within first and second heat exchange blocks of FIG. 4, FIG. 6 is a schematic configuration diagram for illustrating an operation of the heat exchange apparatus according to an embodiment of the present invention, and FIG. 7 shows a block diagram of the dry system of a multi-staged separation heat exchange type according to an embodiment of the present invention.

MODE FOR INVENTION

The objects, characteristics and other advantages of the present invention may become more evident by describing a preferred embodiment of the present invention in detail with reference to the accompanying drawings. Hereinafter, a dry system of a multi-staged separation heat exchange type according to an embodiment of the present invention is described in detail with reference to the accompanying drawings.

Referring to FIG. 1, a dry system 10 of a multi-staged separation heat exchange type that is the present invention includes a dryer 100, a heater 200, a heat exchange apparatus 900 including a first main body 300 and a second main body 400, and a main controller 1000 (refer to FIG. 7).

After outside cold air is introduced into the heater 200 through a ventilation fan 220, the heater 200 heats the introduced air to a certain temperature. In this case, the outside cold air is partially heated by the heat exchange apparatus 900 and supplied to the heater 200.

The heated air of the heater 200 is introduced into the dryer 100 through a supply line 210 by the driving of the ventilation fan 220. The dryer 100 has a dry room therein and dries a target to be dried, such as agricultural and marine products, at a certain speed.

Furthermore, the warm air (hereinafter referred to as "first air") of waste heat discharged by the dryer 100 is introduced into the heat exchange apparatus 900 through a discharge line 110. The heat exchange apparatus 900 recovers heat from the warm first air, performs a heat exchange on the recovered heat so that it is supplied as outside cold air (hereinafter referred to as "second air"), and discharges the second air through a discharge fan 330.

That is, the waste heat air discharged by the dryer 100 cannot be directly used because it has high humidity. Accordingly, the heat exchange apparatus 900 recovers heat from the waste heat discharged by the dry room, performs a heat exchange on the recovered heat so that it is supplied as outside cold and dry air, and discharges the cold and dry air.

Referring to FIGS. 2 to 5, the heat exchange apparatus 900 according to the present invention includes the first main body 300 in which the warm first air of waste heat discharged by the dryer 100 flows through an inlet 310 on one side (left) and exits through the outlet 320 on the other side (right) and a heat medium is circulated therein, the second main body 400 which is disposed on the first main body 300 and in which second air, that is, outside cold air, flows therein through an inlet 410 on the other side (right) and exits to an outlet 420 on one side (left) and a heat medium is circulated therein, a heat medium connection pipe 530 and a heat medium circulation pipe 510 which connect the first main body 300 and the second main body 400 to provide a heat medium circulation path, and a heat medium circulation pump 500 which circulate the heat medium within the first main body 300 and the second main body 400 and a cleaning solution spray unit 600.

In this case, a filter P is disposed in the inlet 410 of the second main body 400 into which the outside second air flows, and thus removes the foreign substance of the second air introduced into the second main body 400.

The heat exchange apparatus 900 is partitioned into the first main body 300 on the lower side and the second main body 400 on the upper side. The first air of hot air is discharged through the first main body 300 and the outside second air passes through the second main body 400, and thus the flow directions of the first air and the second air are reversed.

In accordance with the present invention, the first main body 300 has been illustrated as being installed on the lower side and the second main body 400 has been installed on the upper side, but the present invention is not limited thereto. The locations of the first main body 300 the second main body 400 may be reversed.

The heat exchange of the first air and the second air is performed by the heat medium. The heat medium of the first main body 300 is heat-exchanged with the first air introduced into the first main body 300 while circulating in the width direction of the first main body 300 from front to back, and is introduced into the second main body 400 through the heat medium connection pipe 530. The heat medium introduced into the second main body 400 is heat-exchanged with the second air introduced into the second main body 400 while circulating in the width direction of the second main body 400 from front to back and is then introduced into the first main body 300 again through the heat medium circulation pipe 510.

As described above, after the heat medium circulates the first main body 300 and absorbs the warm first air introduced into the first main body 300, the heat medium is introduced into the second main body 400. The heat medium introduced into the second main body 400 supplies heat to the cold second air.

The first main body 300 and second main body 400 of the heat exchange apparatus 900 have structures corresponding to each other. That is, a plurality of the first heat exchange blocks 700 of the first main body 300 is disposed at specific intervals, and a plurality of the second heat exchange blocks 800 of the second main body 400 is also disposed at specific intervals. Furthermore, the first and the second heat exchange blocks 700 and 800 corresponding to each other on the upper and lower sides perform heat exchange by exchanging heat media.

Furthermore, the first and the second heat exchange blocks 700 and 800 disposed on the upper and lower sides are disposed in multiple columns and multiple stages within the heat exchange apparatus 900 and exchange heat media through heat medium circulation tubes 726 and 826 that are paths along which the heat medium is circulated. As shown in FIG. 5, a plurality of first, second heat exchange plates 710, 810 in each of which a plurality of circulation tube through holes H through which the plurality of first, second heat medium circulation tubes 726, 826 penetrates is disposed within the first, second heat exchange block 700, 800 at specific intervals in the width direction of the first, second heat exchange block 700, 800 from front to back.

Accordingly, a heat medium introduced into the first heat exchange block 700 is heat-exchanged with first air, that is, hot air, while circulating the inside of the first heat medium circulation tube 726 and is then introduced into the corresponding second heat exchange block 800 disposed on the upper side through the heat medium connection pipe 530. A heat medium introduced into the second heat exchange block 800 is heat-exchanged with outside second air while circulating the inside of the second heat medium circulation tube 826. The heat medium that has been subjected to the heat exchange is introduced into the corresponding first heat exchange block 700 again disposed on the lower side through the heat medium circulation pipe 510.

The heat medium circulation pump 500 is disposed in the path of the heat medium circulation pipe 510 to circulate the heat medium. Meanwhile, the main controller 1000 individually controls the flow rate of a heat medium that flows into the heat exchange block 700, 800 by individually controlling the heat medium circulation pump 500 for the optimal heat transfer of the heat medium. This is described later.

Furthermore, a makeup water storage tank K in which makeup water is stored is connected to the path of the heat medium circulation pipe 510 through a connection pipe, and processes air within the pipe through which the heat medium circulates.

Meanwhile, a first, second whirl generation block 750, 850 is disposed between the first, second heat exchange blocks 700 and 800. Each of the first and the second whirl generation blocks 750 and 850 has an empty space therein, and changes a flow of each of the first and the second airs passing through each of the first and the second heat exchange blocks 700 and 800 to a whirl. That is, air passing through each of the first and the second heat exchange blocks 700 and 800 has an approximately streamline flow by each of the first and the second heat exchange plates 710 and 810 and each of the first and the second heat medium circulation tubes 726 and 826 disposed within each of the first and the second heat exchange blocks 700 and 800. The air is introduced into each of the first and the second whirl generation blocks 750 and 850 of the empty spaces and changed to a whirl. Accordingly, the flow velocity of the air is reduced, the heat transfer time of the air is increased, and waste heat air and outside air are uniformly mixed and have a uniform temperature distribution, thereby being capable of improving heat efficiency of the heat exchanger apparatus.

As shown in FIG. 6, the air of the waste heat, that is, the first air introduced into the first main body 300, is heat-exchanged with the heat medium while sequentially passing through the plurality of first heat exchange blocks 700. Accordingly, the temperature of the air gradually drops and the air is discharged (T1>T2>T3). The outside air, that is, the second air introduced into the second main body 400 is heat-exchanged with the heat medium while sequentially passing through the plurality of second heat exchange blocks 800. Accordingly, the temperature of the outside air gradually rises and the outside air is discharged (T1'>T2'>T3'>).

The second air subjected to the heat exchange while passing through the second heat exchange blocks 800 of the second main body 400 is introduced into the heater 200, heated and introduced into the dryer 100, thus heating and drying a target to be dried within the dryer.

As described above, the first air and the second air are not heat-exchanged within one space, but are heat-exchanged by a heat medium that circulates the first main body 300 and the second main body 400 while flowing in the independent first main body 300 and second main body 400.

Furthermore, the plurality of heat exchange blocks 700 and 800 is disposed in the first and the second main bodies 300 and 400, a heat medium circulates heat exchange blocks corresponding to each other, and the whirl generation block 750, 850 is disposed between the first, second heat exchange blocks 700, 800. Accordingly, there is an effect in that heat exchange efficiency is excellent because a heat exchange is stepwise performed while air sequentially passes through the heat exchange blocks.

The cleaning solution spray unit 600 is disposed in the first and the second heat exchange blocks 700 and 800 to remove dust attached to the inside of the heat exchange blocks. Specifically, the cleaning solution spray unit 600 includes a cleaning solution tank 620, cleaning solution transfer lines 630, cleaning solution spray nozzles 640, and a cleaning solution transfer pump 650.

A cleaning solution supplied to the cleaning solution transfer line 630 is transferred through the plurality of cleaning solution transfer lines 630 disposed in the width direction of the first and the second heat exchange blocks 700 and 800 from front to back. Next, the cleaning solution is sprayed through the plurality of cleaning solution spray nozzles 640 disposed in the cleaning solution transfer lines 630, thus removing dust attached to the first and the second heat exchange blocks 700 and 800 and the heat medium circulation tubes 726 and 826.

In this case, the cleaning solution transfer pump 650 of each of the cleaning solution spray units 600 is connected to the main controller 1000 so that the amount of supply of the cleaning solution is controlled depending on the amount of dust attached to the heat exchange blocks 700 and 800 and the heat medium circulation tubes 726 and 826. A vent pipe (not shown) for discharging a cleaning solution cleaned as described above may be formed under the first and the second heat exchange blocks.

Accordingly, if waste heat air passes through the heat exchange blocks of the dry system 10, a large amount of dust attached to the heating surfaces of the heat medium circulation tubes 726 and 826 can be cleaned and a fouling phenomenon in which the heating surfaces of the heat medium circulation tubes are corroded can be prevented. Accordingly, heat efficiency of the heat exchanger can be further improved and the lifespan thereof can be greatly extended.

FIG. 7 shows a block diagram of the dry system according to an embodiment of the present invention. A temperature sensor, a humidity sensor and a flow sensor are disposed in each of the discharge line 110 and the supply line 210 of the dryer 100. The main controller 100 receives temperature, humidity and flow rate information of the inflow stage and outflow stage of the heat exchange apparatus 900 information from the sensors, and controls the flow rate and velocity of air and the flow rate and velocity of a heat medium in order to optimize heat transfer efficiency. That is, the main controller 1000 receives the temperature, humidity and flow rate information of the inflow stage and outflow stage of the heat exchange apparatus 900, and controls the ventilation fan 220 and the discharge fan 330 so that the flow rates of the first air and the second air are controlled. Furthermore, the main controller 1000 controls each of the heat medium circulation pumps 500 so that the flow rate and transfer speed of a heat medium circulating the first and the second heat exchange blocks 700 and 800 are adjusted, thereby optimizing heat transfer efficiency.

Furthermore, the main controller 1000 controls the cleaning solution transfer pumps 650 of the cleaning solution spray units 600 so that a cleaning solution is adjusted and sprayed based on a set time and amount. Accordingly, as described above, dust attached to the heating surfaces of the heat exchange blocks are easily cleaned by control of the cleaning solution spray unit 600 through the main controller 1000. Accordingly, there are effects in that a reduction of heat efficiency of the heat exchanger and a fouling phenomenon in which the heating surfaces are corroded due to the attached dust can be prevented and thus the lifespan of the heat exchanger can be greatly extended.

Furthermore, the main controller 1000 and a display unit 1100 are interconnected. The main controller 1000 integrally controls the dry system 10 and sends the control state of the dry system to a smartphone 1200 in real time so that the dry system 10 is remotely controlled.

Although the preferred embodiment of the present invention has been described above, the present invention is not limited to the aforementioned specific embodiment. That is, a person having ordinary skill in the art to which the present invention pertains may change and modify the present invention in various ways without departing from the spirit and scope of the attached claims, and all of such proper changes and modifications and equivalents thereof should be construed as belonging to the range of right of the present invention.

The present invention has an industrial applicability to an industrial dry system, in particular, an agricultural and marine product dry system in which waste heat discharged from a dryer after a raw material is dried is recovered and stepwise heat-exchanged using a heat exchange medium when outside air is preheated.

The invention claimed is:

1. A dry system of a multi-staged separation heat exchange type, the dry system comprising:
a dryer,
a heat exchange apparatus recovering heat from first air of a high temperature and high humidity discharged by the dryer, heating-exchanging the first air with outside dry second air of a low temperature and discharging the heat-exchanged air,
a heater heating the second air discharged by the heat exchange apparatus,
a discharge fan supplying the first air discharged by the dryer to the heat exchange apparatus and externally discharging the first air, and
a ventilation fan supplying the second air discharged by the heat exchange apparatus to the dryer through the heater,
wherein the heat exchange apparatus comprises:
a first main body in which the first air discharged by the dryer flows therein on one side and exits therefrom on the other side, a plurality of first heat exchange blocks having first heat medium circulation tubes disposed therein is disposed at specific intervals so that a heat medium heat-exchanged with the first air circulates within the first heat exchange blocks in a width direction from front to back, and a first whirl generation block changing a flow of the first air passing through the first heat exchange block into a whirl is disposed between the first heat exchange blocks;
a second main body which is disposed over or under the first main body adjacent to the first main body and in which the second air flows therein on the other side and exits therefrom on one side, and a plurality of second heat exchange blocks having second heat medium circulation tubes disposed therein is disposed at specific intervals within the second main body so that a heat medium heat-exchanged with the second air circulates within the second heat exchange blocks in the width direction from front to back, wherein the second heat exchange block is disposed over or under a corresponding first heat exchange block, the heat exchange blocks corresponding to each other up and down exchange heat media, and a second whirl generation block changing a flow of the second air passing through the second heat exchange block to a whirl is disposed between the second heat exchange blocks;
a plurality of heat medium connection pipes each of which is connected to the first heat medium circulation tube and the second heat medium circulation tube and along each of which the heat medium heat-exchanged with the first air passing through the first heat exchange block is introduced into a corresponding second heat exchange block and a plurality of heat medium circulation pipes along each of which the heat medium introduced from the first heat exchange block to the second heat exchange block and heat-exchanged with the second air passing through the second heat exchange block is introduced into a corresponding first heat exchange block again;
a plurality of heat medium circulation pumps, each of the plurality of heat medium circulation pumps being disposed along the path of the heat medium circulation pipe and circulating the heat media of the first and the second heat exchange blocks corresponding to each other;
a plurality of cleaning solution spray units, each of the plurality of cleaning solution spary units being disposed in the first and the second heat exchange blocks and removing dust attached to the first and the second heat medium circulation tubes within the first and the second heat exchange blocks, respectively; and
a main controller controlling the ventilation fan and the discharge fan so that flow rates of the first air and the second air flowing into a discharge line and a supply line are adjusted, controlling the heat medium circulation pumps so that a circulation flow rate and velocity of the heat media flowing into the first and the second heat exchange blocks are adjusted, and controlling the cleaning solution spray units so that a cleaning solution is adjusted and sprayed based on a set time and amount.

2. The dry system of claim 1, wherein the cleaning solution spray unit comprises:
a cleaning solution tank in which a cleaning solution inlet to which a cleaning solution is injected from the outside is formed;
cleaning solution transfer lines connected to the cleaning solution tank to form a path along which the cleaning solution is transferred and disposed in multiple columns in a height direction of the heat exchange blocks;
a plurality of cleaning solution spray nozzles disposed in the width direction of the heat exchange blocks on the cleaning solution transfer lines from front to back and removing dust attached to the heat medium circulation tubes within the heat exchange blocks; and
a cleaning solution transfer pump disposed over the cleaning solution transfer lines on the side of the cleaning solution tank and transferring and spraying the cleaning solution.

3. The dry system of claim 1, wherein the main controller receives information from a temperature sensor, a humidity sensor and a flow sensor disposed in each of the discharge line and the supply line and controls each of the heat medium circulation pumps so that the flow rate and transfer velocity of a heat medium circulating the first and the second heat exchange blocks corresponding to each other are adjusted.

4. The dry system of claim 1, wherein:
a plurality of first and second heat exchange plates are disposed within the first and the second heat exchange blocks, respectively, at specific intervals in the width direction of the first and the second heat exchange blocks from front to back, wherein, in each of the plurality of first and second heat exchange plates, a plurality of circulation tube through holes are formed, and wherein the plurality of first and the second heat medium circulation tubes pass through the plurality of circulation tube through holes, an inside of each of the first and the second whirl generation blocks comprises an empty space, and flows of the first air and the second air passing through the first and the second heat exchange blocks are introduced into the first and the second whirl generation blocks and changed to whirls.

\* \* \* \* \*